United States Patent [19] — Pinto et al.

[11] Patent Number: 4,721,611
[45] Date of Patent: Jan. 26, 1988

[54] HYDROGEN PRODUCTION

[75] Inventors: Alwyn Pinto, Middlesbrough; Ian C. Jeffery, Billingham, both of England

[73] Assignee: Imperial Chemical Industries PLC, London, England

[21] Appl. No.: 898,401

[22] Filed: Aug. 20, 1986

Related U.S. Application Data

[63] Continuation-in-part of Ser. No. 703,531, Feb. 20, 1985, Pat. No. 4,695,442.

[30] Foreign Application Priority Data

| Mar. 2, 1984 [GB] | United Kingdom | 8405591 |
| Jul. 4, 1984 [GB] | United Kingdom | 8417016 |
| Jul. 4, 1984 [GB] | United Kingdom | 8417017 |
| Oct. 9, 1984 [GB] | United Kingdom | 8425508 |
| Aug. 30, 1985 [GB] | United Kingdom | 8521649 |

[51] Int. Cl.$^4$ .............................................. C01B 2/10
[52] U.S. Cl. .................................... 423/655; 423/656
[58] Field of Search .................................. 423/655, 656

[56] References Cited

U.S. PATENT DOCUMENTS 4,369,255  1/1983  Supp .
4,383,982  5/1983  Pinto ................................ 423/656

FOREIGN PATENT DOCUMENTS

A157480  10/1985  European Pat. Off. .
58-9801   1/1983  Japan .
A1267603  3/1972  United Kingdom .

OTHER PUBLICATIONS

Kirk-Othmer "Encyclopedia of Chemical Technology", 3rd Edition, vol. 4, (Published 1978), p. 776.
Kirk-Othmer "Encyclopedia of Chemical Technology", 3rd Edition, vol. 12, (Published 1988), pp. 951–952.

Primary Examiner—John Doll
Assistant Examiner—Wayne A. Langel
Attorney, Agent, or Firm—Cushman, Darby & Cushman

[57] ABSTRACT

Catalytic shift is effected in a reactor provided using a copper catalyst in indirect heat exchange with boiling water at a gas flow rate of 200 to 800 kg mol per hour per m$^3$ of catalyst. The shift is effected using an outlet temperature in the range 230° to 280° C. that is preferably 10° to 30° C. below the maximum, or inlet, temperature. The heat exchange surface is 30 to 200 m$^2$ per m$^3$ of catalyst.

10 Claims, No Drawings

HYDROGEN PRODUCTION

This application is a continuation-in-part of application Ser. No. 703,531 filed Feb. 20, 1985, now U.S. Pat. No. 4,695,442, entitled "Hydrogen".

This invention relates to the production of hydrogen containing gas streams and in particular to the procuction of hydrogen by the catalytic "shift" reaction wherein carbon monoxide is reacted with steam in the presence of a catalyst to give hydrogen and carbon dioxide.

This reaction is operated on a large scale in a variety of forms, according, inter alia, to the temperature at which it is conducted, the inlet carbon monoxide content, and the presence of absence of sulphur compounds. Most commonly, as in an ammonia plant wherein the synthesis gas is derived from a hydrocarbon feedstock by steam reforming, the shift reaction is carried out in single adiabatic catalyst beds, usually with a first stage having an outlet temperature in the range 400° to 500° C., followed by cooling by indirect heat exchange, and then in a second stage using an outlet temperature under 300° C. Where the carbon monoxide content of the inlet gas stream is too high, for example as in plants based on the partial oxidation of carbonaceous feedstocks, to permit operation in a single adiabatic bed, then such beds are usually subdivided and some cooling is provided between the parts of the bed.

It has been proposed in GB-A-1267603 to carry out the shift reaction at a temperature in the range 150° to 290° C. in the presence of a copper containing catalyst in an externally cooled tubular reactor. This reference indicates that the carbon monoxide content of the inlet gas stream can be as high as 30% by volume and yet only a single stage is necessary. The reference indicates that the temperature is preferably in the range 180° to 230° C. In the specific example it is indicated that the temperature does not exceed 230° C. at any point in the catalyst bed.

In EP-A-157480 there is described a process sequence for making ammonia synthesis gas including a shift stage operated in indirect heat exchange with a coolant, especially water under pressure. EP-A-157480 indicates that the shift reaction can advantageously be brought to equilibrium at a temperature typically in the range 230° to 280° C., with an outlet temperature 10° to 30° C. lower than the inlet temperature to give a gas stream containing 0.1 to 1% by volume of carbon monoxide. Such an outlet temperature corresponds to an inlet temperature in the range 240° to 310° C. and is convenient for the heat recovery requirements in and upstream of the shift stage: it has now been appreciated that operation in particularly advantageous conditions is possible.

Accordingly the present invention provides a process for the production of a hydrogen containing gas stream comprising subjecting a raw gas containing steam, carbon dioxide, hydrogen, and carbon monoxide, and having a carbon monoxide contant of at least 8% by volume on a dry basis, to the catalytic shift reaction at a superatmospheric pressure and elevated temperature in a single stage in the presence of a catalyst containing copper metal and at least one oxidic support material in indirect heat exchange with a coolant whereby to reduce the carbon monoxide content to less than 1% by volume on a dry basis, characterised in that (a) the process is operated at an outlet temperature in the range 230° to 280° C., (b) the catalyst bed is equipped with heat exchange tubes and/or plates providing 30 to 200 m$^2$ of heat exchange surface contacted by the gas stream within the catalyst bed per m$^3$ of catalyst and the coolant on the cold side of such tubes and/or plates is boiling water, and (c) the gas flow rate through the catalyst is in the range 200 to 800 kg mol per hour per m$^3$ of catalyst.

The process is operated at superatmospheric pressure, preferably at above 3 bar abs., and especially at above 30 bar abs.

The inlet temperature is preferably in the range 240° to 310° C. and the outlet temperature is 10° to 30° C. lower than the inlet temperature. In this case a substantial part of the reaction, for example down to a carbon monoxide content in the range 2 to 3% by volume on a dry basis, can be effected at temperatures at which the reaction is very fast, so that flow rates in the higher part of the stated range, for example above 700 kg mol. h$^{-1}$.m$^{-3}$, can be used: where the flow rate is above 300 kg mol. h$^{-1}$.m$^{-3}$, the heat transfer surface is preferably above 50 m$^2$.m$^{-3}$. This form of the invention, wherein the outlet temperature is 10° to 30° C. lower than the inlet temperature, is of particular utility in a process wherein, upstream of the shift stage, a desulphurised reformable hydrocarbon feedstock is reacted with steam, and also possibly with a gas containing nitrogen and oxygen, for example air, in one or more stages over one or more catalysts so as to reach, or approach, equilibrium at a temperature in the range 750° to 1000° C., and heat is recovered from the resulting hot gas. Usually sufficient steam is introduced before such high temperature reactions to provide the steam required in the process of the invention although more steam may be added prior to the shift stage if desired. In this type of process, the carbon monoxide content of the gas stream entering the shift stage is typically up to 15% by volume on a dry basis.

In an alternative form of the process of the invention, the inlet temperature is in the range 100° to 240° C. and the catalyst bed includes an inlet zone in which the reaction is relatively slow and, indeed, if the inlet temperature is low enough, in which the main effect is preheating of the reactants by heat transfer from the boiling water. Since in such a preheat zone, the boiling water is on the hot side rather than the cool side, the heat transfer surface area of 30 to 200 m$^2$ per m$^3$ of catalyst required in the present invention is additional to that in the preheat zone. As a result the vessel required for the shift reaction is rather larger than in the process wherein there is no preheat zone. This form of the invention is of particular utility in a process wherein, upstream of the shift reaction, a non-volatile feedstock, for example heavy oil, residual oil, shale, coal, biomass, or waste carbonaceous material such as tyres, is reacted with an oxygen reactant, for example air, oxygen enriched air, or oxygen, followed by cooling, coarse purification from dust, carbon, and tar, and fine purification from sulphur compounds: such purification steps often involve treatment at under 100° C., possibly at sub-ambient temperatures, and are followed by the addition of the steam required in the shift process. In this type of process the inlet carbon monoxide content is typically in the range 15 to 40% by volume on a dry basis in preferred processes where the upstream oxygen reactant is air, but may be higher, for example up to 65%, if pure oxygen is used as the oxygen reactant. As a result of the high inlet carbon monoxide content, the rate of heat evolution in the shift reaction is high, thereby providing some compensation for the increased vessel volume resulting from the presence of a preheat zone. In this process, the maximum temperature in the shift reaction is usually in the temperature range 240° to 310° C. and is followed by a falling temperature profile giving an outlet temperature in the aforementioned range 230° to 280° C. that is 10° to 30° C. below the maximum temperature.

Where the heat exchange is at tube surfaces, the catalyst may be disposed in tubes surrounded by the boiling water. Alternatively the catalyst may be disposed on the shell side of the tubes with the boiling water in the tubes. In the latter case the reactor may be of the type described in EP-A-81948 or EP-A-82609: these references give general directions as to the disposition of the tubes to suit the local levels of heat evolution and, where appropriate, of feed gas preheating. Whichever heat transfer surface configuration is employed, the pressure on the water side is typically in the range 15 to 50 bar abs, but is preferably within 10, particularly within 5, bar of the pressure of the reactants so that the tubes or plates are not highly stressed. It is further preferred that the steam/water pressure is lower than the pressure of the reactants so that accidental rupture of a tube or plate does not result in water contacting the catalyst. If the steam/water pressure is near or below the reactants pressure, the steam generated can not conveniently be used directly as process steam. However the heat evolved in the shift reaction can be used to produce the process steam by indirect heat exchange of the boiling water, or steam produced therefrom, with water at a suitably higher pressure to produce a stream of hot water which is contacted with a dry reactant or reactants upstream of the shift stage so as to effect saturation of that reactant or reactants. Where the water/steam pressure is above the reactants pressure, by controlling the water flow rate in the shift heat exchange so that incomplete vaporisation takes place, the process steam can be produced by contacting the resulting steam/water mixture with a dry reactant, or reactants, so as to saturate the latter. Thus where a gaseous hydrocarbon is reacted with steam as aforesaid upstream of the shift reaction, the steam/water mixture may be used to saturate the gaseous hydrocarbon. Equally where a carbon monoxide-rich gas is produced, for example as a result of a reaction of a non-volatile feedstock with an oxygen reactant as described above, the carbon monoxide-rich gas may be saturated by contact with the steam/water mixture. In a preferred process steam is raised in the shift reactor in a first, closed, circuit and condensed by indirect heat exchange with water in a second cirduit; the resulting condensate in the first circuit is returned to the shift reactor as the coolant, while the hot water, which may, optionally, be partially boiling, in the second circuit is contacted with the reactant, e.g. the gaseous hydrocarbon or carbon monoxide-rich gas as aforesaid, so as to saturate the latter.

In addition to copper, the catalyst typically contains zinc oxide and at least one stabilising oxide selected from the group consisting of alumina, vanadia, chromia, rare earth oxides, and calcium aluminate cement. Typically the copper and zinc atoms constitute 20 to 70% of the total number of metal atoms in the catalyst.

The preferred catalyst for use in at least the parts of the bed in which the temperature is over 250° C., and conveniently for the whole bed apart from any non-catalytic zones, comprises copper, zinc oxide, at least one oxide of a trivalent metal having an ionic radius in the range 0.05 to 0.7 nm and magnesia, the proportion of magnesia being such that the magnesium atoms constitute 0.2 to 7% of the total number of copper, zinc, and magnesium atoms. The proportion of magnesia is preferably such that the proportion of magnesium atoms so expressed is over 0.4, and especially in the range 0.6 to 6, %. The proportion of copper is typically such that the proportion of copper atoms, expressed in a similar fashion, is at least 20, especially in the range 30 to 75, %. The proportion of zinc oxide is typically such that the proportion of zinc atoms, expressed in a similar fashion, is at least 10, especially in the range 20 to 75, %. The proportion of trivalent metal oxide is typically such that the proportion of trivalent metal atoms is in the range 1 to 50, especially 3 to 30, % of the total number of copper, zinc, magnesium, and trivalent metal atoms. It is preferred that at least some of the trivalent metal oxide is present as a highly dispersed or combined form such that it cannot be identified as a distinct phase by X-ray crystallography. Some of the trivalent metal oxide, or an oxide of another metal, may be present as an identifiable phase in which case it may act as a diluent, or temperature moderator, or to increase the mechanical strength of the catalyst. Such an oxide, wherein the metal is other than copper, zinc, or magnesium, and that is present as an identifiable phase, may be present to the extent of up to 50% by weight on the total catalyst, calculating the copper metal as copper oxide. The highly dispersed or combined oxide is preferably one or more of alumina, vanadia, and chromia. The identifiable oxide is preferably hydrated, eg hydrated alumina.

The catalyst employed in the shift reaction may be the same throughout the bed if a catalyst of appropriate activity and stability is available, but it may be advantageous to use more than one catalyst, especially if the direction of flow of the reactants is downwards through the bed.

In particular, a shift catalyst of relatively high alumina content, for example 20 to 40% by weight, can be used in the zone where the shift reaction is the fastest and heat evolution the most rapid; a suitable catalyst is a so-called "medium-temperature" shift catalyst, a methanol synthesis catalyst in which 40 to 70% of the number of metal atoms in the catalyst are copper atoms, or a magnesia containing catalyst as described above.

In order to increase the rate of reaction in high temperature zones, in which diffusion limitation is likely to be encountered, the catalyst in such high temperature zones may be units of higher geometric surface area per unit volume, compared to the catalyst units in other zones.

In addition to the zones containing active catalyst, the inlet end of the catalyst bed may have a preheat zone, suitably charged with inert granules such as alpha alumina, to enable the inlet gas, for example a carbon monoxide-rich gas resulting from a partial oxidation stage as aforesaid, to be brought up to the temperature at which the catalyst is active and/or ensure that any water in the gas is fully vaporised.

There may also be a chloride guard bed at the inlet to the shift catalyst. Thus copper containing shift catalysts are de-activated by halides which are often introduced into the process gas stream as halides, particularly as contaminants in the water employed to produce the steam required for the shift reaction and any upstream reaction involving steam, e.g. steam reforming. Halides may also be introduced as contaminants in air added to the process gas stream, e.g. as in secondary reforming where ammonia synthesis gas is being produced. In order to prevent de-activation of the shift catalyst there have been proposals, e.g. in GB-A-1357335, of employing a guard bed of an alkaline material, e.g. alkalised alumina, upstream of the shift catalyst. However such guard beds have not been widely adopted because there is a risk that if water condenses on the alkaline material, halide and alkali will be washed on to the shift catalyst. Copper containing shift catalysts are de-activated by alkali as well as by halide. Condensation of water is liable to occur of the guard bed is not above the dew point of the steam in the process gas. Such conditions are liable to be encountered during start-up of the process and/or where the process has temporarily been halted eg. because of a fault somewhere in the overall process. This has meant that precautions have to be taken to avoid such condensation, e.g. by cycling hot gas through the system and/or effecting start-up at low pressures.

While it is possible to employ a larger volume of shift catalyst than would be required if a guard bed were to be employed, so that the inlet portion of the shift catalyst bed acts in a sacrificial manner and absorbs any poisons in the gas stream so that the remainder of the shift catalyst bed can effect the desired reaction, because of the presence of heat exchange surfaces in the shift reactor in the process of the invention, the aforementioned risks of condensation, e.g. during start-up, can be avoided so that a chloride guard zone, suitably comprising particles carrying a basic alkali, or alkaline earth compound, can be employed. Thus, by providing means to heat the coolant water during start-up and/or during any temporary interruption to the process, the guard bed and catalyst bed can be maintained above the dew point of steam in the reactant gas mixture. Since heat exchange surfaces are present in the reactor, the temperature can be maintained high enough by the boiling water, both during operation of the plant and during any temporary shut-down or during start-up, to avoid condensation of liquid water, which would wash alkali from such a guard bed into the downstream shift catalyst. If desired an alkali trap, for example an adsorptive material such as alumina, may be provided downstream of such a guard bed to adsorb any alkali vaporised from the guard bed.

The invention is illustrated by the following example which gives design conditions for the shift stage in an ammonia plant having a design capacity of 490 te per day.

In this process desulphurised natural gas feedstock is reacted with steam over a supported nickel catalyst in an externally heated tubular reactor and the product of that reaction is reacted with air, brought to equilibrium over a second supported nickel catalyst, heat exchanged with the tubular reactor as the heat source for the latter, and cooled to 265° C. in various heat recoveries. The cooled gas is passed over a copper/zinc oxide/magnesia/alumina catalyst as described above and in which, of the total number of metal atoms, 59% are copper, 23.5% are zinc, 15.1% are aluminium, and 2.4% are magnesium. The catalyst is in the form of squat cylindrical pellets of 3.6 mm diameter and 5.4 mm length and is contained in tubes surrounded by water in a pressure shell.

The catalyst pellets are disposed in 850 tubes of internal diameter 73 mm to give a bed of height 3.4 m. The volume of the catalyst bed is thus about 12 m$^3$, so that there is about 55 m$^2$ of heat exchange surface in contact with the gas stream in the bed per m$^3$ of catalyst.

The temperature (T), pressure (P), and flow rates of the components of the gas stream shift at the shift inlet and outlet are set out in the following table.

| | T (°C.) | P (bar abs.) | Flow rate (kg mol/h) | | | | | | |
|---|---|---|---|---|---|---|---|---|---|
| | | | CO | $CO_2$ | $H_2$ | $CH_4$ | $N_2$ | Ar | $H_2O$ |
| inlet | 265 | 37 | 406 | 198 | 1631 | 23 | 1107 | 42 | 1321 |
| outlet | 250 | 36 | 19 | 585 | 2018 | 23 | 1107 | 42 | 934 |

The gas flow rate is thus 394 kg mol per hour per m$^3$ of catalyst. The heat evolution is 4.83 MW; this is transferred to water boiling in the pressure shell under a pressure of 39.4 bar abs., and the steam produced is condensed in indirect heat exchange with water under a pressure of 43 bar abs. which is thereby heated to 241° C. for use in saturating the natural gas feedstock. The condensed steam is returned to the pressure shell.

Instead of using 850 tubes of 73 mm internal diameter, a larger number of smaller tubes could be used thus providing a greater heat exchange surface area. Thus there may be 3600 tubes of internal diameter 38 mm, thus providing 105 m$^2$ of heat exchange surface in contact with the gas stream per m$^3$ of catalyst: in this case, to obtain the same volume of catalyst, the bed height is about 2.9 m. Which tube arrangement is preferred depends on the desired flow rate of water in the shell.

In another example, using about 15 m$^3$ of the catalyst pellets disposed in 750 tubes of internal diameter 67 mm to give a bed height of about 5.7 m and providing about 60 m$^2$ of heat exchange surface in contact with the gas stream per m$^3$ of catalyst, and using a gas stream of higher carbon monoxide content, the temperature (T), pressure (P), and flow rates of the components of the gas stream shift at the shift inlet and outlet are set out in the following table.

| | T (°C.) | P (bar abs.) | Flow rate (kg mol/h) | | | | | | |
|---|---|---|---|---|---|---|---|---|---|
| | | | CO | $CO_2$ | $H_2$ | $CH_4$ | $N_2$ | Ar | $H_2O$ |
| inlet | 270 | 38 | 450 | 154 | 1675 | 20 | 830 | 10 | 1408 |
| outlet | 245 | 37 | 20 | 584 | 2105 | 20 | 830 | 10 | 978 |

The gas flow rate is thus 303 kg mol per hour per m$^3$ of catalyst. The heat evolution is 5.79 MW; this is transferred to water boiling in the pressure shell under a pressure of 35 bar abs.

We claim:

1. A process for the production of a hydrogen containing gas stream comprising subjecting a raw gas containing steam, carbon dioxide, hydrogen, and carbon monoxide, and having a carbon monoxide content of at least 8% by volume on a dry basis, to the catalytic shift reaction at superatmospheric pressure and elevated temperature in a single stage in the presence of a catalyst containing copper metal and at least one oxidic support material in indirect heat exchange with a coolant whereby to reduce the carbon monoxide content to less than 1% by volume on a dry basis, characterised in that (a) the process is operated at an outlet temperature in the range 230° to 280° C.,
(b) the catalyst bed is equipped with heat exchange tubes and/or plates providing 30 to 200 m² of heat exchange surface contacted by the gas stream within the catalyst bed per m³ of catalyst and the coolant on the cold side of such tubes and/or plates is boiling water, and
(c) the gas flow rate through the catalyst is in the range 200 to 800 kg mol per hour per m³ of catalyst.

2. A process according to claim 1 wherein the inlet temperature is in the range 240° to 310° C. and the outlet temperature is 10° to 30° C. below the inlet temperature.

3. A process according to claim 2 wherein the flow rate of the gas mixture through the catalyst is above 300 kg mol per hour per m³ of catalyst.

4. A process according to claim 3 wherein the heat transfer surface contacted by the gas stream within the catalyst bed is above 50 m² per m³ of catalyst.

5. A process according to claim 1 wherein the inlet temperature is in the range 100° to 240° C. and upstream of the catalyst there is an inlet zone in indirect heat exchange with the boiling water to serve as a preheat zone.

6. A process according to claim 5 wherein the maximum temperature in the catalyst bed is in the range 240° to 310° C. and the outlet temperature is 10° to 30° C. below said maximum temperature.

7. A process according to claim 5 wherein the carbon monoxide content of the raw gas stream is 15 to 65% by volume on a dry basis.

8. A process according to claim 1 wherein the pressure of the boiling water is within 10 bar of the pressure of the raw gas stream.

9. A process according to claim 1 wherein heat is recovered from the boiling water by indirect heat exchange of the boiling water or the steam raised therein with a stream of water, thereby producing a stream of hot water, and at least part of the steam present in the raw gas stream is obtained by contacting the raw gas, or a reactant used to produce the raw gas, with said stream of hot water.

10. A process according to claim 1 wherein upstream of the catalyst there is a chloride guard bed containing particles carrying a basic alkali, or alkaline earth, compound, in indirect heat exchange with the coolant and means are provided to heat said coolant during start-up and any temporary shut-down of the plant whereby the guard bed may be maintained at a temperature above the dew point of the steam in the raw gas stream during start-up or temporary shut down of the plant.

* * * * *